United States Patent
Luo et al.

(10) Patent No.: US 10,219,195 B2
(45) Date of Patent: Feb. 26, 2019

(54) TERMINAL CONTROL METHOD, RADIO NETWORK CONTROLLER AND BASE STATION

(71) Applicant: Huawei Technologies Co., Ltd., Shenzhen (CN)

(72) Inventors: Xiaojun Luo, Shanghai (CN); Youtuan Zhu, Shanghai (CN); Huali Qi, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 137 days.

(21) Appl. No.: 15/355,456

(22) Filed: Nov. 18, 2016

(65) Prior Publication Data
US 2017/0070934 A1 Mar. 9, 2017

Related U.S. Application Data

(63) Continuation of application No. PCT/CN2014/077780, filed on May 19, 2014.

(51) Int. Cl.
*H04W 52/04* (2009.01)
*H04W 36/18* (2009.01)
(Continued)

(52) U.S. Cl.
CPC .......... *H04W 36/18* (2013.01); *H04W 28/08* (2013.01); *H04W 52/14* (2013.01);
(Continued)

(58) Field of Classification Search
None
See application file for complete search history.

(56) References Cited

U.S. PATENT DOCUMENTS 8,285,321 B2    10/2012  Ji et al.
2008/0146154 A1  6/2008  Claussen et al.
(Continued)

FOREIGN PATENT DOCUMENTS

CN    102123486 A    7/2011
CN    102761920 A    10/2012
(Continued)

OTHER PUBLICATIONS

Liu, J., et al., "Uplink Power Control and Interference Coordination for Heterogeneous Network," IEEE 23rd International Symposium on Personal, Indoor and Mobile Radio Communications (PIMRC), Sep. 9-12, 2012, 5 pages.

(Continued)

*Primary Examiner* — Ayanah S George
(74) *Attorney, Agent, or Firm* — Slater Matsil, LLP

(57) ABSTRACT

Embodiments provide a terminal control method, a radio network controller, and a base station. The method includes: determining, by an RNC, that a downlink serving base station of a terminal that establishes a connection with both a macro base station and a micro base station is the macro base station; acquiring, by the RNC, a target power control value, where the target power control value can be used to ensure that channel quality of an uplink control channel from the terminal to the macro base station reaches a target threshold; and sending, by the RNC, the target power control value to the micro base station.

15 Claims, 10 Drawing Sheets

(51) Int. Cl.
    *H04W 52/14*      (2009.01)
    *H04W 52/24*      (2009.01)
    *H04W 52/38*      (2009.01)
    *H04W 28/08*      (2009.01)
    *H04W 88/02*      (2009.01)
    *H04W 88/08*      (2009.01)
    *H04W 88/12*      (2009.01)

(52) U.S. Cl.
    CPC ....... *H04W 52/146* (2013.01); *H04W 52/244* (2013.01); *H04W 52/386* (2013.01); *H04W 88/02* (2013.01); *H04W 88/08* (2013.01); *H04W 88/12* (2013.01)

(56) References Cited

U.S. PATENT DOCUMENTS

2012/0157152 A1* 6/2012 Blomgren ........... H04W 52/146
                                                    455/522

2012/0213092 A1* 8/2012 Sun ..................... H04W 52/244
                                                    370/248

FOREIGN PATENT DOCUMENTS

| | | |
|---|---|---|
| CN | 103384371 A | 11/2013 |
| CN | 103548397 A | 1/2014 |
| CN | 103747496 A | 4/2014 |
| EP | 2838288 A1 | 2/2015 |
| WO | 2008093100 A2 | 8/2008 |
| WO | WO 2014000244 A1 * | 1/2014 ............ H04W 16/10 |

OTHER PUBLICATIONS

Nokia Siemens Networks, et al., "TP for Section 7.1.2 and 7.1.3 on Potential Solutions in 7.1 Solutions for Co-channel Scenarios," 3GPP TSG RAN WG1 Meeting #73, R1-132704, Fukuoka, Japan, May 20-24, 2013, 11 pages.

* cited by examiner

TERMINAL CONTROL METHOD, RADIO NETWORK CONTROLLER AND BASE STATION

CROSS-REFERENCE TO RELATED APPLICATIONS

This application is a continuation of International Application No. PCT/CN2014/077780, filed on May 19, 2014, the disclosure of which is hereby incorporated by reference in its entirety.

TECHNICAL FIELD

Embodiments of the present invention relate to communications technologies, and in particular, to a terminal control method, a radio network controller, and a base station.

BACKGROUND

In a heterogeneous network (Hetnet), downlink transmit power of a macro base station and that of a micro base station are different, resulting that a downlink coverage radius of the macro base station is different from a downlink coverage radius of the micro base station. Generally, the downlink coverage radius of the macro base station is greater than the downlink coverage radius of the micro base station. However, uplink transmit power, of a same terminal (UE), in sending an uplink signal to the macro base station and that in sending an uplink signal to the micro base station are the same; and therefore, an uplink coverage radius of the macro base station and that of the micro base station are equal. This situation is an uplink-downlink coverage imbalance problem in the Hetnet.

Because of the uplink-downlink coverage imbalance, a UE in a handover area of the Hetnet is easily subject to the following problems: power of the UE in the handover area is controlled by a micro base station with better uplink signal quality, and the micro base station instructs, when quality of a received uplink signal of the UE is higher than a threshold, the UE to reduce uplink transmit power; however, a serving base station of the UE is determined by quality of a downlink signal. For a UE whose downlink signal from a macro base station is of better quality in the handover area, its serving base station is the macro base station. However, quality of an uplink signal from the UE to the macro base station is originally relatively poor, that is, quality of an uplink signal from the UE to the macro base station is inferior to quality of an uplink signal from the UE to the micro base station, and the micro base station further instructs the UE to reduce uplink transmit power, which may result that the UE is out-of-synchronization with the macro base station in an uplink direction, that is, a communication connection with the macro base station may be disconnected.

SUMMARY

Embodiments of the present invention provide a terminal control method, a radio network controller, and a base station, to avoid occurrence of uplink out-of-synchronization of a terminal in a handover area of a heterogeneous network.

According to a first aspect, a terminal control method is provided. The method is applied to a heterogeneous network, where the heterogeneous network includes a macro base station, a micro base station, and a radio network controller RNC. The method includes determining, by the RNC, that a downlink serving base station of a terminal that establishes a connection with both the macro base station and the micro base station is the macro base station. The method also includes acquiring, by the RNC, a target power control value, where the target power control value is used to ensure that channel quality of an uplink control channel from the terminal to the macro base station reaches a target threshold. The method also includes sending, by the RNC, the target power control value to the micro base station, so that the micro base station controls uplink transmit power of the terminal according to the target power control value.

With reference to the first aspect, in a first possible implementation manner, the acquiring, by the RNC, a target power control value includes: separately acquiring, by the RNC, a first target signal to interference ratio and a second target signal to interference ratio, where the first target signal to interference ratio is used to control the channel quality of the uplink control channel from the terminal to the macro base station to reach the target threshold, and the second target signal to interference ratio is used to control channel quality of an uplink data channel from the terminal to the macro base station to reach a target threshold; and selecting, by the RNC, a larger value from the first target signal to interference ratio and the second target signal to interference ratio, as the target power control value.

With reference to the first aspect, in a second possible implementation manner, the acquiring, by the RNC, a target power control value includes: receiving, by the RNC, a target channel measurement counter value that is of the uplink control channel and that is sent by the macro base station; and obtaining, by the RNC according to the target channel measurement counter value, a power control value corresponding to the target channel measurement counter value, as the target power control value.

With reference to the first aspect, in a third possible implementation manner, the acquiring, by the RNC, a target power control value includes: receiving, by the RNC, the target power control value sent by the macro base station, where the target power control value is a power control value that is corresponding to a target channel measurement counter value and that is obtained by the macro base station by adjusting a power control value according to a channel measurement counter value of the uplink control channel.

With reference to any one of the first aspect to the third possible implementation manner of the first aspect, in a fourth possible implementation manner, after the sending, by the RNC, the target power control value to the micro base station, the method further includes: sending, by the RNC, user information of at least one terminal in an adjacent cell of the micro base station to the micro base station, so that the micro base station cancels, according to the user information of the at least one terminal, a target uplink interference signal of the terminal from an uplink signal that is of the terminal and that is received by the micro base station.

According to a second aspect, a terminal control method is provided. The method is applied to a heterogeneous network, where the heterogeneous network includes a macro base station, a micro base station, and a radio network controller RNC. The method includes acquiring, by the micro base station, a target power control value sent by the RNC, where the target power control value is used to ensure that channel quality of an uplink control channel from a terminal to the macro base station reaches a target threshold. The method also includes controlling, by the micro base station according to the target power control value, uplink transmit power of the terminal, where the terminal establishes a connection with both the macro base station and the micro base station, and a downlink serving base station of the terminal is the macro base station.

With reference to the second aspect, in a first possible implementation manner, the target power control value is a corresponding power control value obtained by the RNC according to a target channel measurement counter value that is of the uplink control channel and that is sent by the macro base station.

With reference to the second aspect, in a second possible implementation manner, the target power control value is received from the macro base station by the RNC.

With reference to any one of the second aspect to the second possible implementation manner of the second aspect, in a third possible implementation manner, after the controlling, by the micro base station according to the target power control value, uplink transmit power of the terminal, the method further includes: receiving, by the micro base station, user information that is of at least one terminal in an adjacent cell of the micro base station and that is sent by the RNC; and canceling, according to the user information of the at least one terminal, a target uplink interference signal of the terminal from an uplink signal that is of the terminal and that is received by the micro base station.

With reference to the third possible implementation manner of the second aspect, in a fourth possible implementation manner, the receiving, by the micro base station, user information that is of at least one terminal in an adjacent cell of the micro base station and that is sent by the RNC; and canceling, according to the user information of the at least one terminal, a target uplink interference signal of the terminal from an uplink signal that is of the terminal and that is received by the micro base station includes: receiving, by the micro base station, uplink scrambling code information that is of the at least one terminal in the adjacent cell of the micro base station and that is sent by the RNC, and parameter information of an uplink control channel from the terminal to the adjacent cell of the micro base station; and acquiring, by the micro base station, an uplink signal of the terminal according to the uplink scrambling code information; demodulating the uplink signal by using the parameter information of the uplink control channel, to obtain a decoded bit; obtaining the target uplink interference signal according to the decoded bit; and canceling the target uplink interference signal from the uplink signal that is of the terminal and that is received by the micro base station.

With reference to the third possible implementation manner of the second aspect, in a fifth possible implementation manner, the receiving, by the micro base station, user information that is of at least one terminal in an adjacent cell of the micro base station and that is sent by the RNC; and canceling, according to the user information of the at least one terminal, a target uplink interference signal of the terminal from an uplink signal that is of the terminal and that is received by the micro base station includes: receiving, by the micro base station, uplink scrambling code information that is of the at least one terminal in the adjacent cell of the micro base station and that is sent by the RNC, a decoded bit sent by a neighboring base station to which the terminal belongs, and parameter information of an uplink control channel of the terminal, where the decoded bit is obtained by the neighboring base station by demodulating an uplink signal of the terminal; and acquiring, by the micro base station, an uplink signal of the terminal according to the uplink scrambling code information, estimating uplink channel information of the terminal according to the parameter information of the uplink control channel, obtaining the target uplink interference signal by reconstructing the decoded bit and the uplink channel information, and canceling the target uplink interference signal from the uplink signal that is of the terminal and that is received by the micro base station.

With reference to the third possible implementation manner of the second aspect, in a sixth possible implementation manner, the receiving, by the micro base station, user information that is of at least one terminal in an adjacent cell of the micro base station and that is sent by the RNC; and canceling, according to the user information of the at least one terminal, a target uplink interference signal of the terminal from an uplink signal that is of the terminal and that is received by the micro base station includes: receiving, by the micro base station, uplink scrambling code information that is of the at least one terminal in the adjacent cell of the micro base station and that is sent by the RNC, a first decoded bit sent by a neighboring base station to which the terminal belongs, and parameter information of an uplink control channel from the terminal to the adjacent cell of the micro base station, where the first decoded bit is obtained by the neighboring base station by demodulating an uplink signal of the terminal; acquiring, by the micro base station, an uplink signal of the terminal according to the uplink scrambling code information, demodulating the uplink signal by using the parameter information of the uplink control channel, to obtain a second decoded bit, and obtaining the target uplink interference signal by reconstructing the first decoded bit and the second decoded bit; and canceling, by the micro base station, the target uplink interference signal from the received uplink signal of the terminal.

According to a third aspect, a radio network controller RNC is provided. The RNC includes a parameter acquiring unit, configured to acquire a target power control value when it is determined that a downlink serving base station of a terminal that establishes a connection with both a macro base station and a micro base station is the macro base station, where the target power control value is used to ensure that channel quality of an uplink control channel from the terminal to the macro base station reaches a target threshold. The RNC also includes a parameter sending unit, configured to send the target power control value to the micro base station, so that the micro base station controls uplink transmit power of the terminal according to the target power control value.

With reference to the third aspect, in a first possible implementation manner, the parameter acquiring unit is specifically configured to receive a target channel measurement counter value that is of the uplink control channel and that is sent by the macro base station, and use a power control value corresponding to the target channel measurement counter value as the target power control value.

With reference to the third aspect, in a second possible implementation manner, the parameter acquiring unit is specifically configured to receive the target power control value sent by the macro base station, where the target power control value is a power control value that is corresponding to a target channel measurement counter value of the uplink control channel and that is obtained by the macro base station.

With reference to any one of the third aspect to the second possible implementation manner of the third aspect, in a third possible implementation manner, the parameter sending unit is further configured to send user information of at least one terminal in an adjacent cell of the micro base station to the micro base station, so that the micro base station cancels, according to the user information of the at least one terminal, a target uplink interference signal of the terminal from an uplink signal that is of the terminal and that is received by the micro base station.

According to a fourth aspect, a base station is provided. The base station includes a parameter receiving unit, configured to acquire a target power control value sent by an RNC, where the target power control value is used to ensure that channel quality of an uplink control channel from a terminal to a macro base station reaches a target threshold. The base station also includes a power control unit, configured to control uplink transmit power of the terminal according to the target power control value, where the terminal establishes a connection with both the macro base station and a micro base station, and a downlink serving base station of the terminal is the macro base station.

With reference to the fourth aspect, in a first possible implementation manner, the target power control value is a corresponding power control value obtained by the RNC according to a target channel measurement counter value that is of the uplink control channel and that is sent by the macro base station.

With reference to the fourth aspect, in a second possible implementation manner, the target power control value is received from the macro base station by the RNC.

With reference to any one of the fourth aspect to the second possible implementation manner of the fourth aspect, in a third possible implementation manner, the parameter receiving unit is further configured to receive user information that is of at least one terminal in an adjacent cell of the base station and that is sent by the RNC; and the base station further includes: an interference control unit, configured to cancel, according to the user information, a target uplink interference signal of the terminal from an uplink signal that is of the terminal and that is received by the base station.

With reference to the third possible implementation manner of the fourth aspect, in a fourth possible implementation manner, the parameter receiving unit is specifically configured to receive uplink scrambling code information that is of the at least one terminal in the adjacent cell of the base station and that is sent by the RNC, and parameter information of an uplink control channel from the terminal to the adjacent cell of the base station; and the interference control unit is specifically configured to acquire an uplink signal of the terminal according to the uplink scrambling code information; demodulate the uplink signal by using the parameter information of the uplink control channel, to obtain a decoded bit, obtain the target uplink interference signal according to the decoded bit; and cancel the target uplink interference signal from the uplink signal that is of the terminal and that is received by the micro base station.

With reference to the third possible implementation manner of the fourth aspect, in a fifth possible implementation manner, the parameter receiving unit is specifically configured to receive uplink scrambling code information that is of the at least one terminal in the adjacent cell of the base station and that is sent by the RNC, a decoded bit sent by a neighboring base station to which the terminal belongs, and parameter information of an uplink control channel of the terminal, where the decoded bit is obtained by the neighboring base station by demodulating an uplink signal of the terminal; and the interference control unit is specifically configured to acquire an uplink signal of the terminal according to the uplink scrambling code information, estimate uplink channel information of the terminal according to the parameter information of the uplink control channel, obtain the target uplink interference signal by reconstructing the decoded bit and the uplink channel information, and cancel the target uplink interference signal from the uplink signal that is of the terminal and that is received by the base station.

With reference to the third possible implementation manner of the fourth aspect, in a sixth possible implementation manner, the parameter receiving unit is specifically configured to receive uplink scrambling code information that is of the at least one terminal in the adjacent cell of the base station and that is sent by the RNC, a first decoded bit sent by a neighboring base station to which the terminal belongs, and parameter information of an uplink control channel of the terminal and that of the neighboring base station to which the terminal belongs, where the first decoded bit is obtained by the neighboring base station by demodulating an uplink signal of the terminal; and the interference control unit is specifically configured to acquire an uplink signal of the terminal according to the uplink scrambling code information, demodulate the uplink signal by using the parameter information of the uplink control channel, to obtain a second decoded bit, obtain the target uplink interference signal by reconstructing the first decoded bit and the second decoded bit, and cancel the target uplink interference signal from the received uplink signal of the terminal.

According to the terminal control method, the radio network controller, and the base station provided in the embodiments of the present invention are used, because a target power control value used to control uplink transmit power of a terminal can be used to ensure minimum channel quality of an uplink control channel from the terminal to a macro base station, when a micro base station controls the uplink transmit power of the terminal according to the target power control value, occurrence of out-of-synchronization of a user, which is a problem in the prior art, can be certainly avoided, thereby avoiding occurrence of uplink out-of-synchronization of a terminal in a handover area of a heterogeneous network.

DETAILED DESCRIPTION OF ILLUSTRATIVE EMBODIMENTS

Figure 1:
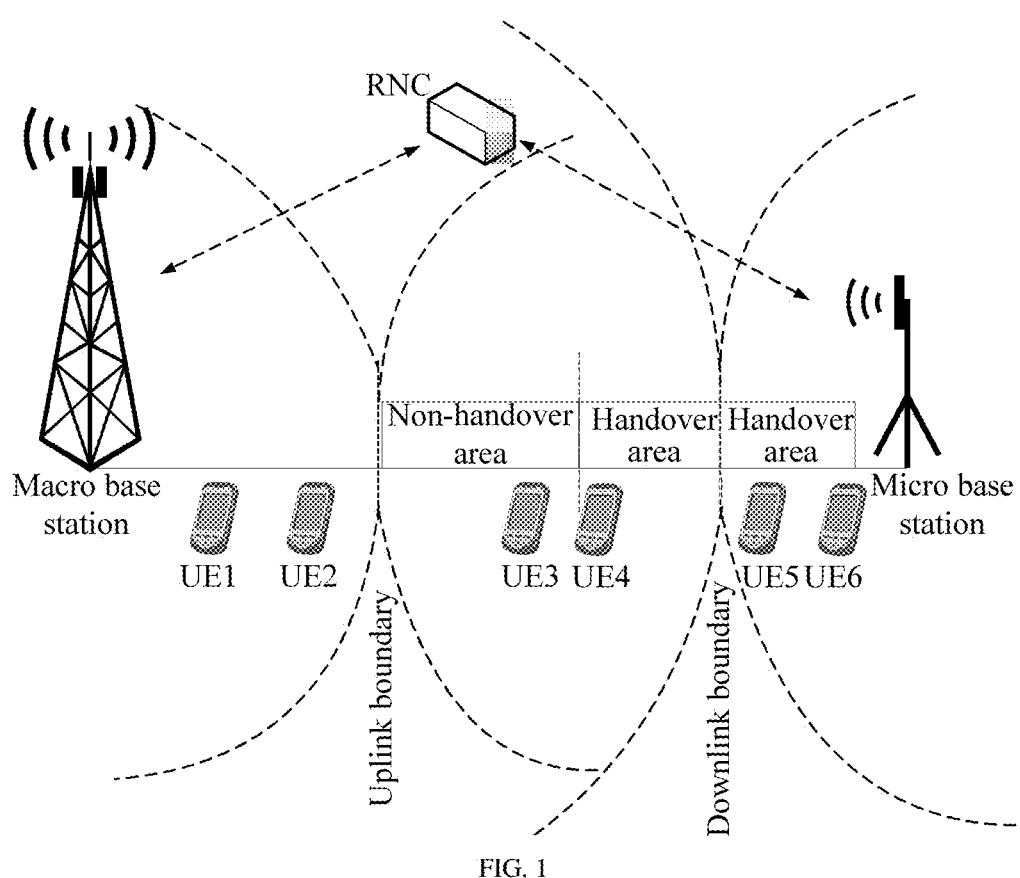
FIG. 1 is a schematic diagram of an application network of a terminal control method according to an embodiment of the present invention.

Embodiments of the present invention provide a terminal control method, where the method can be applied to controlling of uplink transmit power of a terminal in a handover area of a heterogeneous network. FIG. 1 is a schematic diagram of an application network of a terminal control method according to an embodiment of the present invention. FIG. 1 shows a Hetnet network, which includes a macro base station (Macro) and a micro base station (Micro). An uplink boundary (UL boundary) and a downlink boundary (DL boundary) of the macro base station and the micro base station are different. FIG. 1 further shows several terminals, including UE1 to UE6, that are separately located in different areas between the macro base station and the micro base station, where UE4 and UE5 are located in a handover area (SHO area) and UE3 is located in a non-handover area (Non-SHO area). FIG. 1 further shows a radio network controller (RNC), where the RNC may establish a communication with both the macro base station and the micro base station.

First, a scenario shown in FIG. 1 is briefly described as follows: a handover area is generally near to the downlink boundary shown in FIG. 1. Specifically, a terminal, for example, UE1, that is closer to the macro base station only establishes uplink and downlink communication connections with the macro base station, and uplink transmit power of UE1 is controlled by the macro base station. As the terminal gradually moves rightward, that is, in a process of moving away from the macro base station towards the micro base station, the terminal continually measures a strength of a downlink signal received by the terminal from a base station, and determines, according to the signal strength, whether to establish a connection with the base station. For example, UE3, when being at a location of UE3 shown in FIG. 1, the terminal learns, through measurement, that there is a relatively large difference between a signal strength of the macro base station and that of the micro base station, that is, a signal of the micro base station is weaker; and therefore, at this location, UE3 still connects only to the macro base station, and is controlled by the macro base station. However, when the terminal arrives at a location of UE4, UE4 learns, through measurement, that signal strength of the micro base station has already been enhanced at this time, and at the same time, determines to establish a connection with the micro base station (however, a serving base station is still the macro base station because the serving base station is a base station with a stronger downlink signal); and therefore, UE4 has already established an uplink connection with both the macro base station and the micro base station. At this time, both the macro base station and the micro base station determine to adjust uplink power of UE4 according to a received uplink signal of UE4, and UE4 receives two power adjustment instructions, one of which is sent by the macro base station, and the other is sent by the micro base station. A principle of UE4 is to increase power if both the two instructions instruct to increase power, and to decrease power if one of the two instructions instructs to decrease power. Likewise, UE5 is also in a handover area and has a connection with both the two base stations, only that a serving base station has already changed to the micro base station. UE6 only has a connection with the micro base station. The foregoing are just simple descriptions, all of which are conventional techniques, and are not repeated in detail in the embodiments.

The terminal control method provided in the embodiments of the present invention can be used to avoid occurrence of uplink out-of-synchronization of a terminal in the handover area of the heterogeneous network. A terminal on which uplink out-of-synchronization may possibly occur herein is UE4 shown in FIG. 1. First, UE4 is located in a downlink coverage area of the macro base station (that is, at a side, of a downlink boundary, that is near to the macro base station); and therefore, for UE4, downlink signal quality of the macro base station is superior to downlink signal quality of the micro base station, and a downlink serving base station of UE4 is the macro base station. However, an optimal uplink of UE4 is the micro base station (that is, an area, of an uplink boundary, that is near to the micro base station); and therefore, quality of an uplink signal that is of UE4 and that is received by the micro base station is superior to quality of an uplink signal that is of UE4 and that is received by the macro base station. A possible situation is that the micro base station instructs UE4 to decrease uplink transmit power because the quality of the received uplink signal of UE4 is relatively good, resulting in that quality of an uplink signal that is transmitted from UE4 to the serving base station, that is, the macro base station, becomes worse, thereby causing out-of-synchronization at the macro base station side. The terminal control method of the embodiments of the present invention is to avoid occurrence of the foregoing out-of-synchronization problem of UE4. For details, reference may be made to the following descriptions of the control method. As for other UEs shown in FIG. 1, for example, UE5 and UE3, the foregoing out-of-synchronization problem does not occur, because UE3 is not in the handover area, and the micro base station cannot control transmit power of UE3; and UE5 has already selected the micro base station as a serving base station, and the micro base station will ensure quality of an uplink signal of UE5.

Embodiment 1

Figure 2:
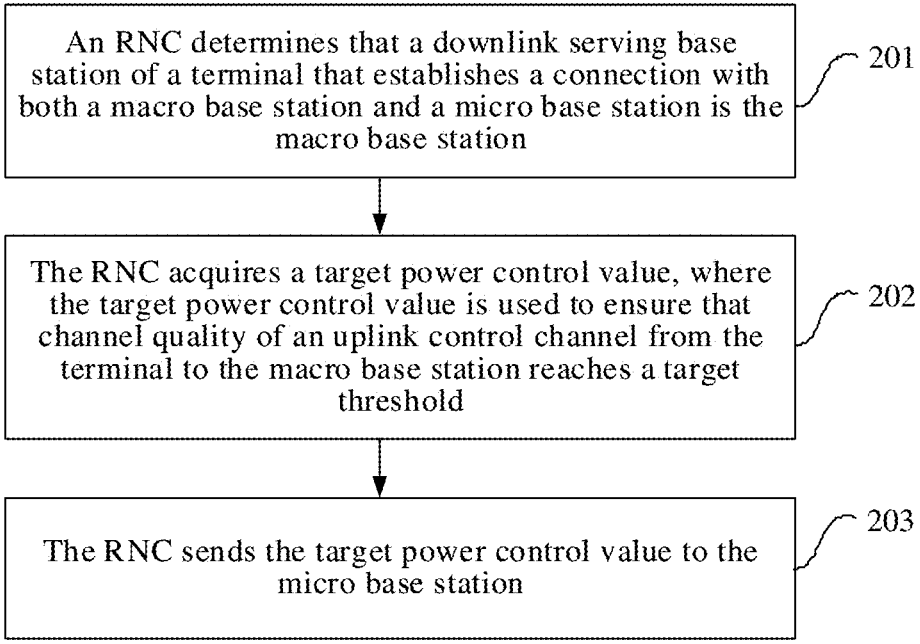
FIG. 2 is a schematic flowchart of a terminal control method according to an embodiment of the present invention.

FIG. 2 is a schematic flowchart of a terminal control method according to an embodiment of the present invention. The method is described with an RNC as an execution body. As shown in FIG. 2, the method may include the following steps.

201. An RNC determines that a downlink serving base station of a terminal that establishes a connection with both a macro base station and a micro base station is the macro base station.

After a UE enters a handover area, in the handover area, the UE has a communication connection with both the macro base station and the micro base station, and the UE is handed over, under control of the RNC, between base stations. For example, the UE reports a downlink signal measurement report of a base station to the RNC. The report may include a strength, obtained by the UE through measurement, of a downlink signal of the base station, for example, including a downlink signal strength of the macro base station and a downlink signal strength of the micro base station. The RNC instructs, according to the signal strength, the UE to enter which base station area. During this process, the RNC can learn which base station is a downlink serving base station of the UE. For example, in this embodiment, the RNC may learn that a downlink serving base station of UE4 is the macro base station, and proceed to perform step 202; and if the RNC learns that a downlink serving base station of UE5 is the micro base station, this process ends and no subsequent step is performed.

202. The RNC acquires a target power control value, where the target power control value is used to ensure that channel quality of an uplink control channel from the terminal to the macro base station reaches a target threshold.

Optionally, the target power control value is, for example, a target signal to interference ratio (SIR target) that is acquired from the macro base station and that can control the channel quality of the uplink control channel from the terminal to the macro base station to reach the target threshold. In this embodiment, it can be ensured that uplink out-of-synchronization does not occur on the uplink control channel from the terminal to the macro base station provided that the channel quality reaches the target threshold.

Optionally, the target power control value may also be obtained in the following manner: the RNC separately acquires a first power control reference value and a second power control reference value.

The first power control reference value is used to ensure minimum channel quality of the uplink control channel from the terminal to the macro base station. The second power control reference value is used to ensure minimum channel quality of an uplink data channel from the terminal to the macro base station. Optionally, the forgoing two power control reference values may be, for example, target signal to interference ratios, where the first power control reference value is a first target signal to interference ratio (SIR target), and the second power control reference value is a second target signal to interference ratio. A value set for the first target signal to interference ratio is used to control channel quality of an uplink control channel from UE4 to the macro base station to reach a target threshold; and a value set for the second target signal to interference ratio is used to control channel quality of an uplink data channel from UE4 to the macro base station to reach a target threshold.

The RNC selects one of the first power control reference value and the second power control reference value as a target power control value. Specifically, the target power control value selected by the RNC can be used to ensure that both the channel quality of the uplink control channel from the terminal to the macro base station and the channel quality of the uplink data channel from the terminal to the macro base station reach the target thresholds. If the SIR target in step 202 is used as an example, in this step, the RNC selects a larger value from the first target signal to interference ratio and the second target signal to interference ratio as the target power control value.

A more specific example is as follows: the first target signal to interference ratio is a1, the second target signal to interference ratio is a2, and a1>a2. If a2 is selected as the target power control value, when a base station controls uplink transmit power of the UE according to the target power control value, and when an SIR target, obtained by the base station through measurement, of an uplink channel is greater than a2, for example, between a1 and a2, the base station instructs the UE to decrease its transmit power. However, at this time, an uplink control channel corresponding to a1 does not meet a requirement of minimum channel quality yet, so that quality of a signal is very poor, and disconnection is possible. If the transmit power of the UE is further decreased, quality of the uplink control channel becomes worse, resulting in occurrence of out-of-synchronization. Assuming that a1 is selected as the target power control value, when the base station controls uplink transmit power of the UE according to the target power control value, for an SIR target of a particular measurement value between a1 and a2, because it does not reach the target power control value yet, the base station instructs the UE to increase the transmit power to meet a minimum quality requirement of a channel, and after the power is increased, the channel quality requirement has already been met without affecting an uplink control channel corresponding to a2. Therefore, the selected target power control value should ensure that both the channel quality of the uplink control channel from the terminal to the macro base station and the channel quality of the uplink data channel from the terminal to the macro base station reach the target thresholds.

203. The RNC sends the target power control value to the micro base station.

In this step, the RNC separately sends the target power control value selected in step 202 to the micro base station, so that the micro base station controls uplink transmit power of the terminal according to the target power control value. UE4 in FIG. 1 is still used as an example, power control of UE4 is usually determined by the micro base station, and in this case, the macro base station basically increases power. Therefore, that the micro base station controls power of the UE according to the target power control value can ensure the minimum channel quality that is of the uplink control channel and at the macro base station, and avoid occurrence of an out-of-synchronization problem. Optionally, the target power control value may also be sent to the macro base station.

In the terminal control method provided in this embodiment, because a target power control value used to control uplink transmit power of a terminal is determined by taking into consideration both channel quality of an uplink control channel of a macro base station and channel quality of an uplink data channel of the macro base station, and the target power control value can be used to ensure that both the channel quality of the uplink control channel from the terminal to the macro base station and the channel quality of the uplink data channel from the terminal to the macro base station reach target thresholds, when a micro base station controls the uplink transmit power of the terminal according to the target power control value, occurrence of out-of-synchronization of a user, which is a problem in the prior art, can be certainly avoided, thereby avoiding occurrence of uplink out-of-synchronization of a terminal in a handover area of a heterogeneous network.

Embodiment 2

Figure 3:
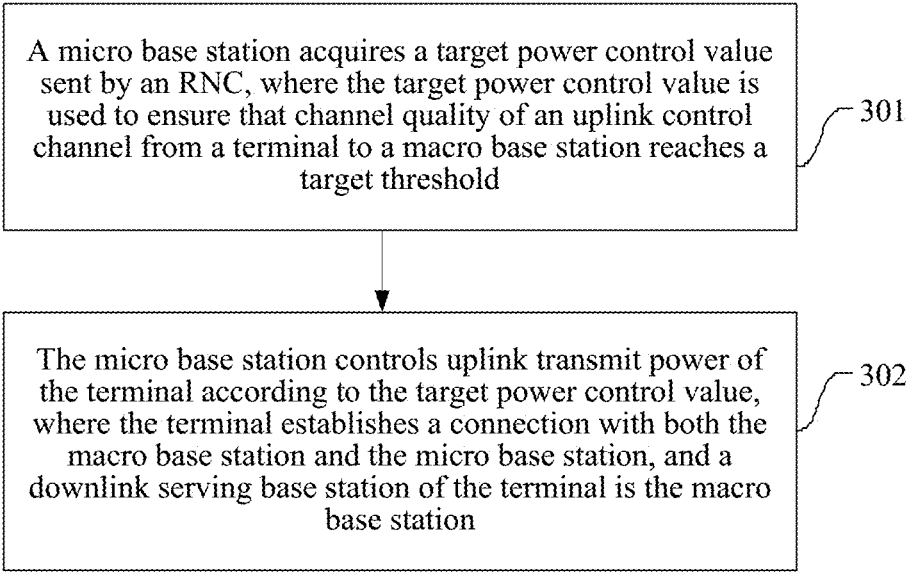
FIG. 3 is a schematic flowchart of another terminal control method according to an embodiment of the present invention.

FIG. 3 is a schematic flowchart of another terminal control method according to an embodiment of the present invention. The method is described with a micro base station as an execution body. As shown in FIG. 3, the method may include the following steps.

301. A micro base station acquires a target power control value sent by an RNC, where the target power control value is used to ensure that channel quality of an uplink control channel from a terminal to a macro base station reaches a target threshold.

Optionally, the target power control value acquired by the base station may be selected from and determined between a first power control reference value and a second power control reference value by the RNC. For example, the first power control reference value is used to ensure that channel quality of the uplink control channel from the terminal to the macro base station reaches the target threshold. The second power control reference value is used to ensure that channel quality of an uplink data channel from the terminal to the macro base station reaches a target threshold. The selected target power control value can be used to ensure that both the channel quality of the uplink control channel from the terminal to the macro base station and the channel quality of the uplink data channel from the terminal to the macro base station reach the target thresholds.

302. The micro base station controls uplink transmit power of the terminal according to the target power control value, where the terminal establishes a connection with both the macro base station and the micro base station, and a downlink serving base station of the terminal is the macro base station.

The power control is intended for a terminal that is in a handover area of a heterogeneous network and whose downlink serving base station is the macro base station, that is, UE4 in FIG. 1. The method of this embodiment may be executed by the micro base station in FIG. 1. Reference may be made to Embodiment 1 for details, which are not described herein again.

A current target signal to interference ratio (the target power control value in this embodiment) used by the micro base station for controlling in this embodiment is determined by the RNC by taking into consideration the channel quality of the uplink control channel and the uplink data channel of the macro base station, and can ensure the channel quality of both the two channels; and therefore, the current target signal to interference ratio is slightly greater than an original target signal to interference ratio, and after the method in this embodiment is used, uplink transmit power of UE4 is also slightly greater than power of UE4 in the prior art. An increase of the uplink transmit power of UE4 further improves channel quality of an uplink control channel from UE4 to the macro base station, thereby avoiding uplink out-of-synchronization.

In the terminal control method provided in this embodiment, because a target power control value used to control uplink transmit power of a terminal is determined by taking into consideration both channel quality of an uplink control channel of a macro base station and channel quality of an uplink data channel of the macro base station, and the target power control value can be used to ensure that both the channel quality of the uplink control channel from the terminal to the macro base station and the channel quality of the uplink data channel from the terminal to the macro base station reach target thresholds, when a micro base station controls the uplink transmit power of the terminal according to the target power control value, occurrence of out-of-synchronization of a user, which is a problem in the prior art, can be certainly avoided, thereby avoiding occurrence of uplink out-of-synchronization of a terminal in a handover area of a heterogeneous network.

Embodiment 3

Figure 4:
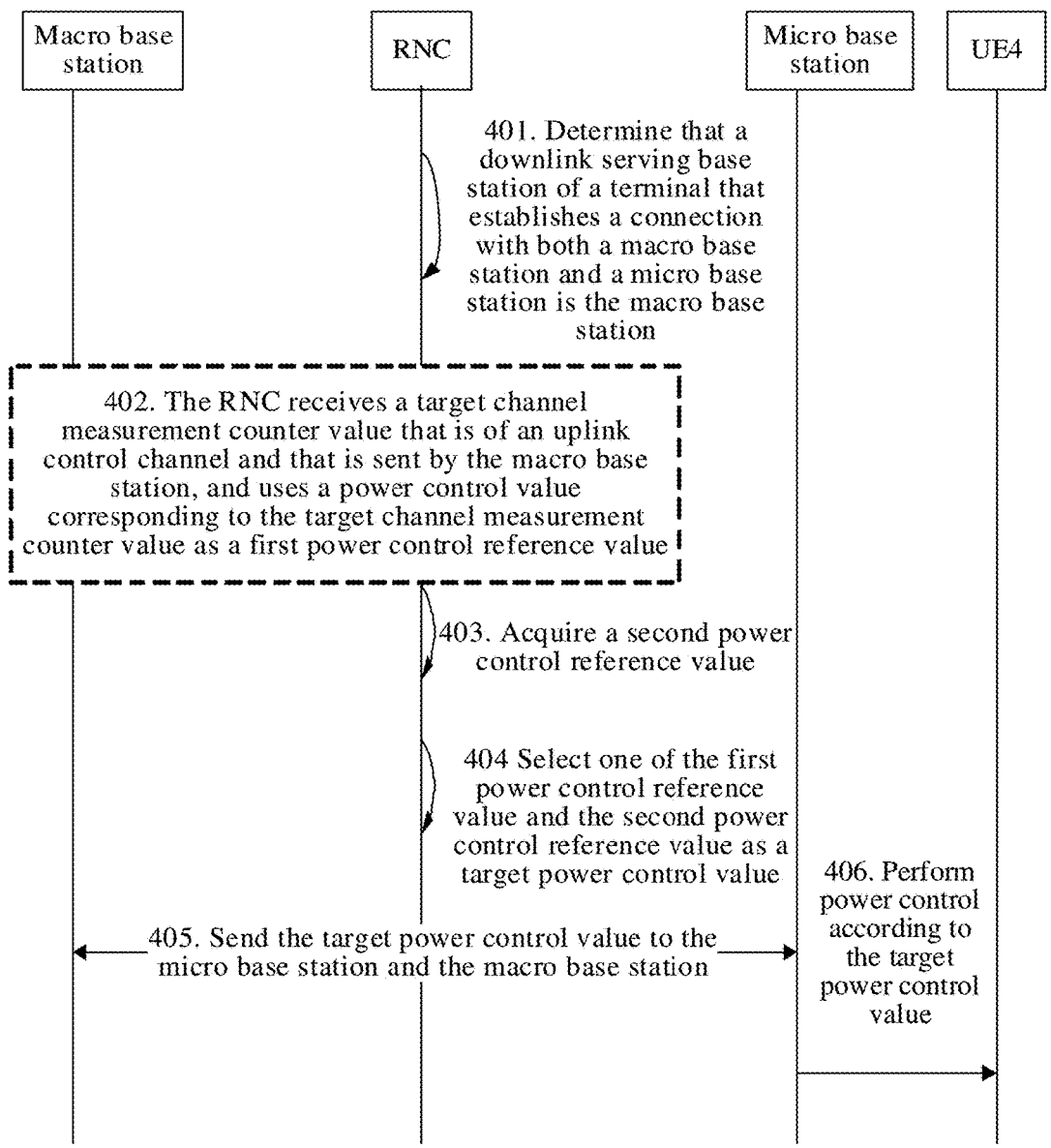
FIG. 4 is a schematic signaling diagram of still another terminal control method according to an embodiment of the present invention.

FIG. 4 is a schematic signaling diagram of still another terminal control method according to an embodiment of the present invention. This embodiment primarily describes one of the manners in which an RNC acquires a first power control reference value, and other steps are briefly described. For details, reference may be made to Embodiment 1 and Embodiment 2. As shown in FIG. 4, the method may include the following steps.

401. An RNC determines that a downlink serving base station of a terminal that establishes a connection with both a macro base station and a micro base station is the macro base station.

In this embodiment, the RNC may learn that a downlink serving base station of UE4 is the macro base station, and proceed to perform step 402.

402. The RNC receives a target channel measurement counter value that is of an uplink control channel and that is sent by the macro base station, and uses a power control value corresponding to the target channel measurement counter value as a first power control reference value.

Optionally, in this step, the RNC may specifically determine the first power control reference value in the following manner: first, the macro base station regularly reports a channel measurement counter value to the RNC, or it may also be that the macro base station sends a channel measurement counter value when receiving a counter acquiring request sent by the RNC. The uplink control channel is an uplink control channel from UE4 to the macro base station. The channel measurement counter value is, for example, a TPC detection probability, a CQI detection probability, a Pilot BER, or a TFCI reference value of missed detection. When receiving uplink control information sent by UE4, the macro base station can obtain the channel measurement counter value, and the macro base station may report at least one of these measurement values to the RNC. Then, the RNC may adjust, according to the received channel measurement counter value sent by the macro base station, a current power control value set on the RNC. After adjusting the power control value, the RNC sends the power control value to the macro base station, for controlling power of the terminal. A channel measurement counter value received from the macro base station in a next time also changes with the adjustment of the power control value until the RNC obtains an expected channel measurement counter value, that is, the target channel measurement counter value. At this time, the RNC can use a power control value corresponding to the target channel measurement counter value as a target power control value. In this embodiment, the target power control value can be called the first power control reference value.

For the following example: It is assumed that a current channel measurement counter value, that is, a TPC detection probability, that is received by the RNC and that is sent by the macro base station is 95%. However, it is possible that corresponding channel quality is relatively good when a TPC detection probability is 99%; and therefore, the TPC detection probability of 99% can be called "the target channel measurement counter value", and a current power control value, that is, an SIR target, can be adjusted according to the target channel measurement counter value. Therefore, in this example, 95% is less than the target channel measurement counter value, and the current SIR target is adjusted. After an adjustment, a change of a channel measurement counter value is observed again, for example, the channel measurement counter value may increase from 95% to 97%, and approach the target channel measurement counter value. Then, an SIR target is readjusted until an observed channel measurement counter value reaches the target channel measurement counter value, and a corresponding SIR target at this time is used as the first power control reference value.

403. The RNC acquires a second power control reference value.

The second power control reference value is used to ensure that channel quality of an uplink data channel from the terminal to the macro base station reaches a target threshold. Actually, the second power control reference value can be used to ensure both the channel quality of the uplink data channel from the terminal to the macro base station and channel quality of an uplink data channel from the terminal to the micro base station reach target thresholds, only that in a handover area, the channel quality of the uplink data channel from the terminal to the micro base station is superior to the channel quality of the macro base station. If the channel quality of the uplink data channel of the macro base station can be ensured, the channel quality of the micro base station can also be ensured.

In this step, a manner for the RNC to acquire the second power control reference value, for example, a second target signal to interference ratio, may be a commonly used method. For example, the macro base station and the micro base station report block error ratios (BLER) to the RNC, and the RNC determines a to-be-used second target signal to interference ratio according to the reported BLERs.

It should be further noted that, step 402 and step 403, that is, that the RNC acquires the first power control reference value and that the RNC acquires the second power control reference value, are processes independent of each other, and can be independently performed without a defined execution order.

It should be further noted that, in this embodiment, the target power control value may also be acquired by performing only step 402, and that the channel quality of the uplink control channel can be ensured. Optionally, the corresponding second power control reference value when the channel quality of the uplink data channel reaches the target threshold may also be further acquired, and at this time, a power control reference value corresponding to the control channel is called the first power control reference value. However, even if the second power control reference value is acquired, it is still that a power control reference value that can ensure both the channel quality of the uplink data channel and the channel quality of the uplink control channel is selected as the target power control value. For example, a larger one of a first target signal to interference ratio and a second target signal to interference ratio is selected as the target power control value. In this embodiment and the subsequent embodiments, acquisition of two values, the first target signal to interference ratio and the second target signal to interference ratio, is used as an example.

404. The RNC selects one of the first power control reference value and the second power control reference value as a target power control value.

405. The RNC separately sends the target power control value to the micro base station and the macro base station.

406. The micro base station controls power of UE4 according to the target power control value.

Both the macro base station and the micro base station control power of UEs in their coverage areas according to the target power control value, only that for a UE in a handover area, for example, UE4, uplink transmit power of UE4 is controlled by the micro base station with better uplink signal quality. The target power control value, that is, the SIR target, is larger than an SIR target used by a micro base station for controlling in the prior art; and therefore, the uplink transmit power of UE4 is also increased, thereby increasing quality of the uplink control channel from UE4 to the serving base station of UE4, that is, the macro base station, and avoiding an out-of-synchronization problem of UE4.

Embodiment 4

Figure 5:
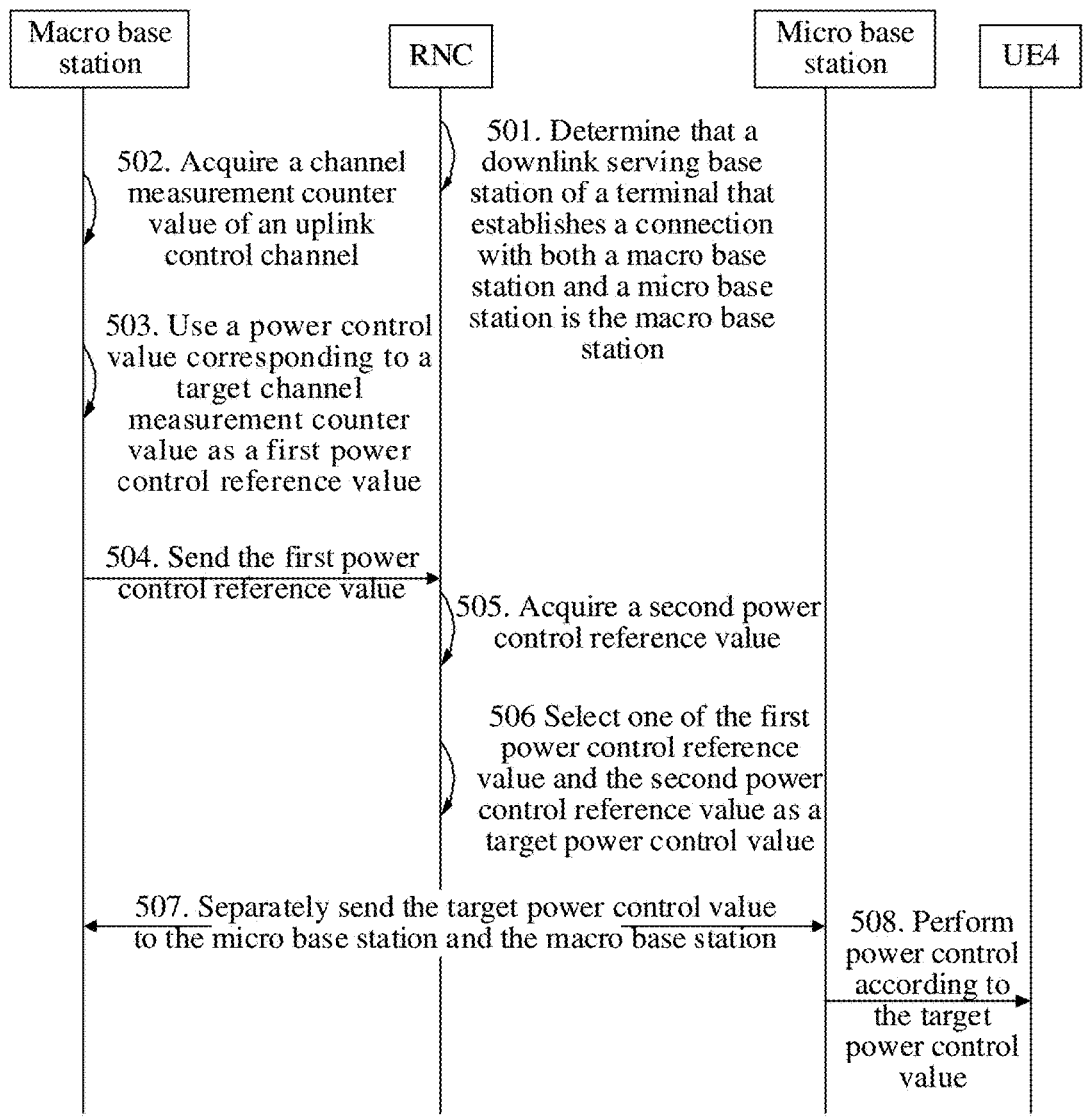
FIG. 5 is a schematic signaling diagram of still another terminal control method according to an embodiment of the present invention.

FIG. 5 is a schematic signaling diagram of still another terminal control method according to an embodiment of the present invention. This embodiment primarily describes another manner in which an RNC acquires a first power control reference value, and other steps are briefly described. For details, reference may be made to Embodiment 1 and Embodiment 2. A difference between this embodiment and Embodiment 3 lies in that the first power control reference value in Embodiment 3 is acquired by the RNC, but the first power control reference value in this embodiment is acquired by a macro base station and is sent to the RNC by the macro base station. As shown in FIG. 5, the method may include:

501. An RNC determines that a downlink serving base station of a terminal that establishes a connection with both a macro base station and a micro base station is the macro base station.

In this embodiment, the RNC may learn that a downlink serving base station of UE4 is the macro base station, and proceed to perform step 502.

502. The macro base station acquires a channel measurement counter value of an uplink control channel.

Optionally, the uplink control channel is an uplink control channel from UE4 to the macro base station. The channel measurement counter value is, for example, a TPC detection probability, a CQI detection probability, a Pilot BER, or a TFCI reference value of missed detection. When receiving uplink control information sent by UE4, the macro base station may obtain the channel measurement counter value.

503. The macro base station uses a power control value corresponding to a target channel measurement counter value as a first power control reference value.

A determining process of this step is similar to a processing process of the RNC in Embodiment 3, and details are not described herein again. Likewise, optionally, the power control value in this step may also be called the first power control reference value.

504. The macro base station sends the first power control reference value to the RNC.

Optionally, in this step, the macro base station may regularly report the first power control reference value to the RNC, or it may be that, the macro base station sends the first power control reference value when receiving a request instruction sent by the RNC.

505. The RNC acquires a second power control reference value.

This step and a process in which the RNC acquires the first power control reference value may be performed independently.

506. The RNC selects one of the first power control reference value and the second power control reference value as a target power control value.

507. The RNC separately sends the target power control value to the micro base station and the macro base station.

508. The micro base station controls power of UE4 according to the target power control value.

Embodiment 5

After the power of UE4 is controlled by using the terminal control methods of the foregoing embodiments, compared with original uplink transmit power, the uplink transmit power of UE4 is increased. A user in another area may use an uplink service link to perform outer loop power control.

In addition, in a typical scenario of a Hetnet single-frequency network, the following interference problem also exists: generally, maximum transmit power of a macro cell is 20 w, and maximum transmit power of a micro cell is 5 w or 1 w. In this case, there is a difference of 6 dB or 13 dB between downlink pilot transmit power of the macro cell and the micro cell, and consequently, the following two problem areas exist: One is a Non-SHO area, where a distance from a UE to the micro cell is less than a distance from the UE to the macro cell, a best cell is the macro cell, and there is no micro cell link. The UE in this area is closer to the micro cell; and therefore, interference from the UE to the micro cell is relatively strong. The other is an SHO area, where a best cell is the macro cell, and there is a micro cell link. After a user enters a macro-micro soft handover area, both the macro cell and the micro cell perform inner loop power control on an uplink of the user. Because an uplink dedicated physical control channel (DPCCH) SIR received by the micro cell is higher than that of the macro cell, the inner loop power control of the micro cell plays a dominant role, resulting in an apparently lower DPCCH SIR of the macro cell, thereby affecting an HSDPA/HSUPA throughput rate of a serving macro cell. In addition, optionally, a macro base station and a micro base station may also control power of another UE within their coverage areas according to a target power control value determined in this embodiment of the present invention, which increases uplink transmit power of the another UE, and may cause uplink signal interference between UEs to a certain degree.

For example, referring to FIG. 1, UE2 in FIG. 1 is located at a side, of an uplink boundary, that is near to a macro base station. Although at this time, both an optimal uplink and an optimal downlink of UE2 are the macro base station, because UE2 is near to the uplink boundary, UE2 still has relatively strong interference to an uplink of a micro base station. Therefore, in this embodiment, the micro base station is used as an example to describe how the micro base station cancels uplink signal interference of a neighboring UE, for example, this method is applicable to both UE2 and UE3, because UE2 and UE3 may cause interference to UE5. Specifically, the micro base station may receive user information that is of at least one terminal in an adjacent cell of the micro base station and that is sent by the RNC, and cancel, according to the user information, a target uplink interference signal of the terminal from an uplink signal that is of the terminal and that is received by the micro base station. Specifically, which kind of user information is received and how to cancel interference according to the user information are described in detail by using several embodiments in the following.

Figure 6:
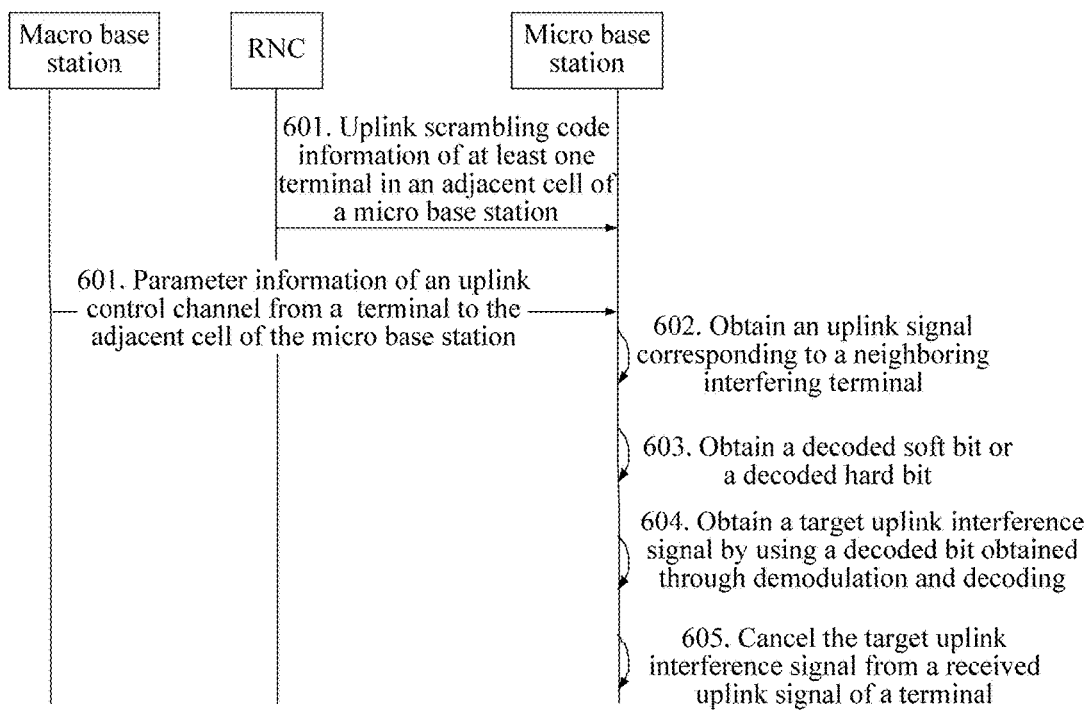
FIG. 6 is a schematic signaling diagram of still another terminal control method according to an embodiment of the present invention.

FIG. 6 is a schematic signaling diagram of still another terminal control method according to an embodiment of the present invention. The method mainly describes the foregoing interference cancellation process. In specific implementation, the interference cancellation may be performed after the foregoing power control of the UE. For example, after controlling power of UE4, the micro base station may cancel interference of a signal of UE4 according to the method in this embodiment when receiving an uplink signal of UE4. This embodiment uses a process in which the micro base station executes interference cancellation as an example. Certainly, optionally, the macro base station may also execute interference cancellation according to this method. As shown in FIG. 6, the method may include the following steps.

601. A micro base station receives uplink scrambling code information that is of at least one terminal in an adjacent cell of a micro base station and that is sent by an RNC, and parameter information of an uplink control channel from the at least one terminal to the adjacent cell of the micro base station.

Uplink scrambling code information of each UE is allocated by the RNC; and therefore, the RNC can know the uplink scrambling code information of the UE. The micro base station may acquire uplink scrambling code information of each UE in the adjacent cell of the micro base station from the RNC. There are possibly several adjacent cells of the micro base station. Using FIG. 1 as an example, the adjacent cell of the micro base station is a cell in which the macro base station is located. The at least one terminal may be each terminal in all adjacent cells of the micro base station. Certainly, each terminal includes a UE with relatively strong interference to the micro base station and a UE with relatively weak interference. In this step, interference degrees may not be differentiated, and the uplink scrambling code information of all neighboring UEs is acquired, which is processed by the micro base station in a subsequent step of this embodiment.

In addition, the micro base station may further receive parameter information that is of an uplink control channel and that is sent by a base station of an adjacent cell. For example, there is possibly a plurality of UEs in the adjacent cell, which may be called a plurality of neighboring terminals. What is acquired in this embodiment is parameter information of an uplink control channel from each neighboring terminal to a neighboring base station to which each neighboring terminal belongs. For example, in FIG. 1, parameter information of an uplink control channel from UE1 to the macro base station, parameter information of an uplink control channel from UE2 to the macro base station, and parameter information of an uplink control channel from UE3 to the macro base station separately correspond to the UEs. The parameter information of an uplink control channel includes, for example, a spreading factor (SF) of a UE. The parameter information of an uplink control channel may be used to demodulate an uplink signal of a UE.

602. The micro base station acquires an uplink signal of the UE according to the uplink scrambling code information, and selects a neighboring interfering UE with strong interference according to a signal strength, to obtain an uplink signal corresponding to the neighboring interfering terminal.

After receiving, in step 601, the uplink scrambling code information that is of each neighboring UE and that is sent by the RNC, where the uplink scrambling code information can be used to identify the UEs, the micro base station may acquire an uplink signal of each neighboring UE according to the uplink scrambling code information and acquire received uplink signal strengths of the neighboring UEs. For example, the received uplink signal strengths of the neighboring UEs may be obtained by means of a blind cell search or a detection algorithm. The micro base station sequences the UEs according to the received uplink signal strengths of the neighboring UEs, and selects a UE with strong interference to the micro base station, which is called a neighboring interfering terminal. Apparently, uplink scrambling code information of the neighboring interfering terminal has already been sent to the micro base station by the RNC in step 601, and parameter information of an uplink control channel of the neighboring interfering terminal and that of the neighboring base station to which the neighboring interfering terminal belongs have also already been sent to the micro base station by the RNC in step 601, and are only differentiated and obtained from the neighboring UEs by the micro base station in this step.

The micro base station adds the obtained neighboring interfering terminal to a demodulation user group in a cell of the micro base station, that is, it is required that an uplink signal of the neighboring interfering terminal be demodulated and that subsequent interference cancellation be performed. For the following example: the micro base station receives an uplink signal of UE5 that is in the cell of the micro base station and also receives an uplink signal of UE3 that is not in the cell of the micro base station, and the micro base station has already determined that a received uplink signal strength of UE3 is relatively high and that UE3 is a user with strong interference (which is called an interfering terminal). The micro base station may select the uplink signal of UE3 from the received uplink signals of the terminals according to uplink scrambling code information of UE3. Certainly, whether to continue to cancel interference after a signal of the neighboring interfering terminal with relatively strong interference is selected is optional. Interference cancellation may also be performed on another terminal with relatively weak interference. A plurality of possible implementation manners are not listed again. All the following embodiments are described by using cancellation of a signal of the neighboring interfering terminal as an example.

603. The micro base station demodulates the uplink signal by using the parameter information of the uplink control channel, to obtain a decoded soft bit or a decoded hard bit.

After identifying the uplink signal of UE3 from the received uplink signals, the micro base station can demodulate the uplink signal of UE3 by using parameter information, for example, an SF, of an uplink control channel that is corresponding to UE3 and that is received by the macro base station, to obtain a decoded bit, where the decoded bit may be a decoded soft bit or a decoded hard bit.

604. The micro base station obtains a target uplink interference signal by using the decoded bit obtained through demodulation and decoding.

The decoded soft bit or the decoded hard bit obtained in step 603 is used to reconstruct a signal, so that the uplink signal of UE3 may be obtained. The uplink signal of UE3 obtained this time is an actual interfering signal and can be called a target uplink interference signal.

605. The micro base station cancels the target uplink interference signal from a received uplink signal of a terminal.

In this step, when the micro base station cancels the uplink signal of UE3, signal interference of UE3 to UE5 is canceled.

In this embodiment, a target uplink interference signal of a neighboring interfering terminal is canceled from an uplink signal that is of a terminal and that is received by a base station, so as to cancel interference of the neighboring interfering terminal, thereby improving quality of the uplink signal received by the base station.

Embodiment 6

Figure 7:
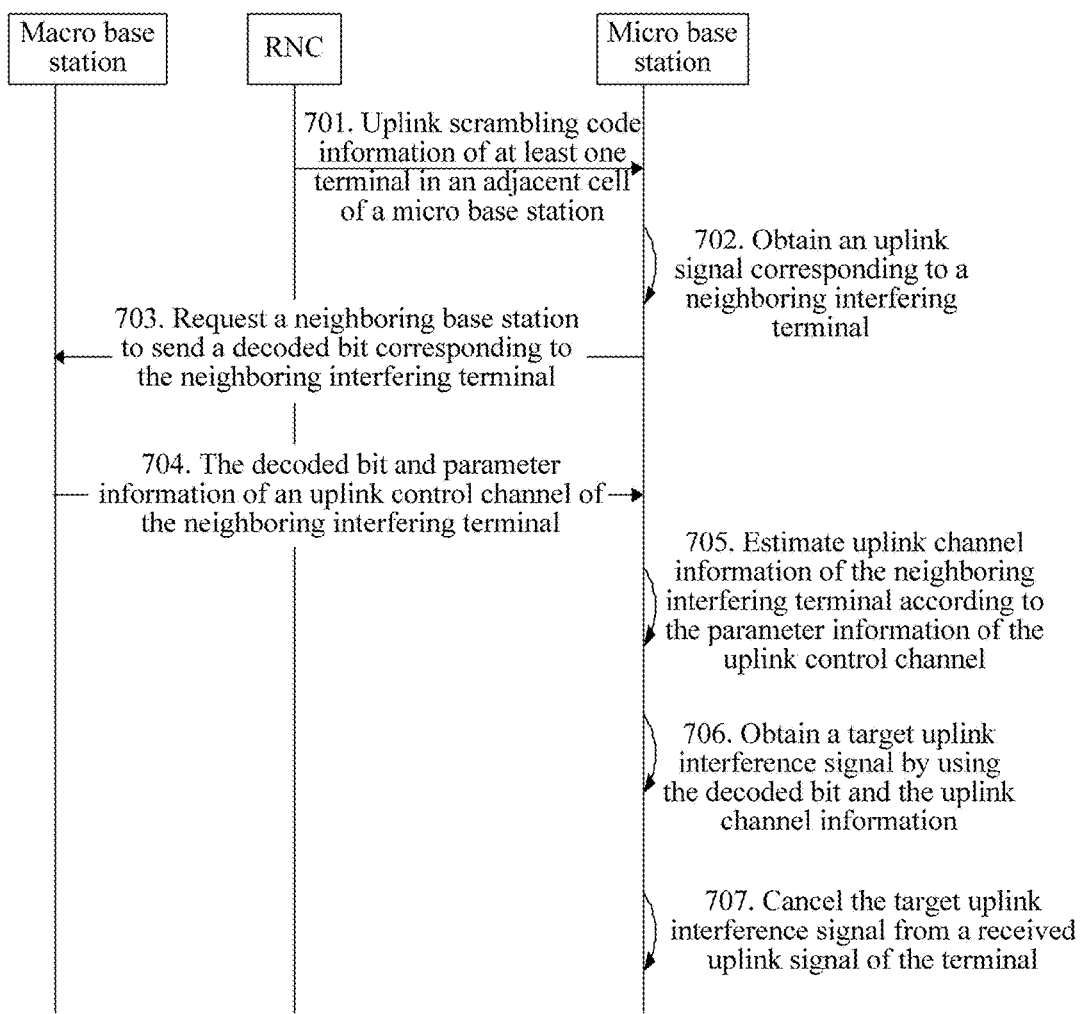
FIG. 7 is a schematic signaling diagram of still another terminal control method according to an embodiment of the present invention.

FIG. 7 is a schematic signaling diagram of still another terminal control method according to an embodiment of the present invention. The method also describes an interference cancellation process, for example, a process in which a micro base station cancels an uplink signal of UE3. A difference between this embodiment and Embodiment 5 lies in that, in Embodiment 5, a macro base station sends a control channel parameter to a micro base station, and the micro base station demodulates a received signal according to the parameter to obtain a decoded bit; but in this embodiment, a macro base station directly sends a decoded bit to a micro base station, and the micro base station directly performs signal reconstruction. As shown in FIG. 7, the method may include:

701. A micro base station receives uplink scrambling code information that is of at least one terminal in an adjacent cell of the micro base station and that is sent by an RNC.

The RNC may report uplink scrambling code information of all UEs in the adjacent cell of the micro base station to the micro base station.

702. The micro base station acquires an uplink signal of the UE according to the uplink scrambling code information, and selects a neighboring interfering UE with strong interference according to a signal strength, to obtain an uplink signal corresponding to the neighboring interfering terminal.

For example, the micro base station acquires an uplink signal of UE3.

703. The micro base station requests a neighboring base station to send a decoded bit corresponding to the neighboring interfering terminal.

In this embodiment, after determining that UE3 is the neighboring interfering terminal, the micro base station may instruct a macro base station to send a decoded bit corresponding to UE3, so as to reconstruct a signal of UE3 by using the decoded bit. When sending the instruction, the micro base station may also send uplink scrambling code information corresponding to UE3 or an identifier of another UE to the macro base station, so that the macro base station can learn that the decoded bit of UE3 is to be obtained.

Optionally, the decoded bit may be regularly reported to the micro base station by the macro base station.

704. The micro base station receives the decoded bit sent by the neighboring base station, and parameter information of an uplink control channel of the neighboring interfering terminal.

705. The micro base station estimates uplink channel information of the neighboring interfering terminal according to the parameter information of the uplink control channel.

706. The micro base station obtains a target uplink interference signal by reconstructing the decoded bit and the uplink channel information.

707. The micro base station cancels the target uplink interference signal from a received uplink signal of a terminal.

Embodiment 7

Figure 8:
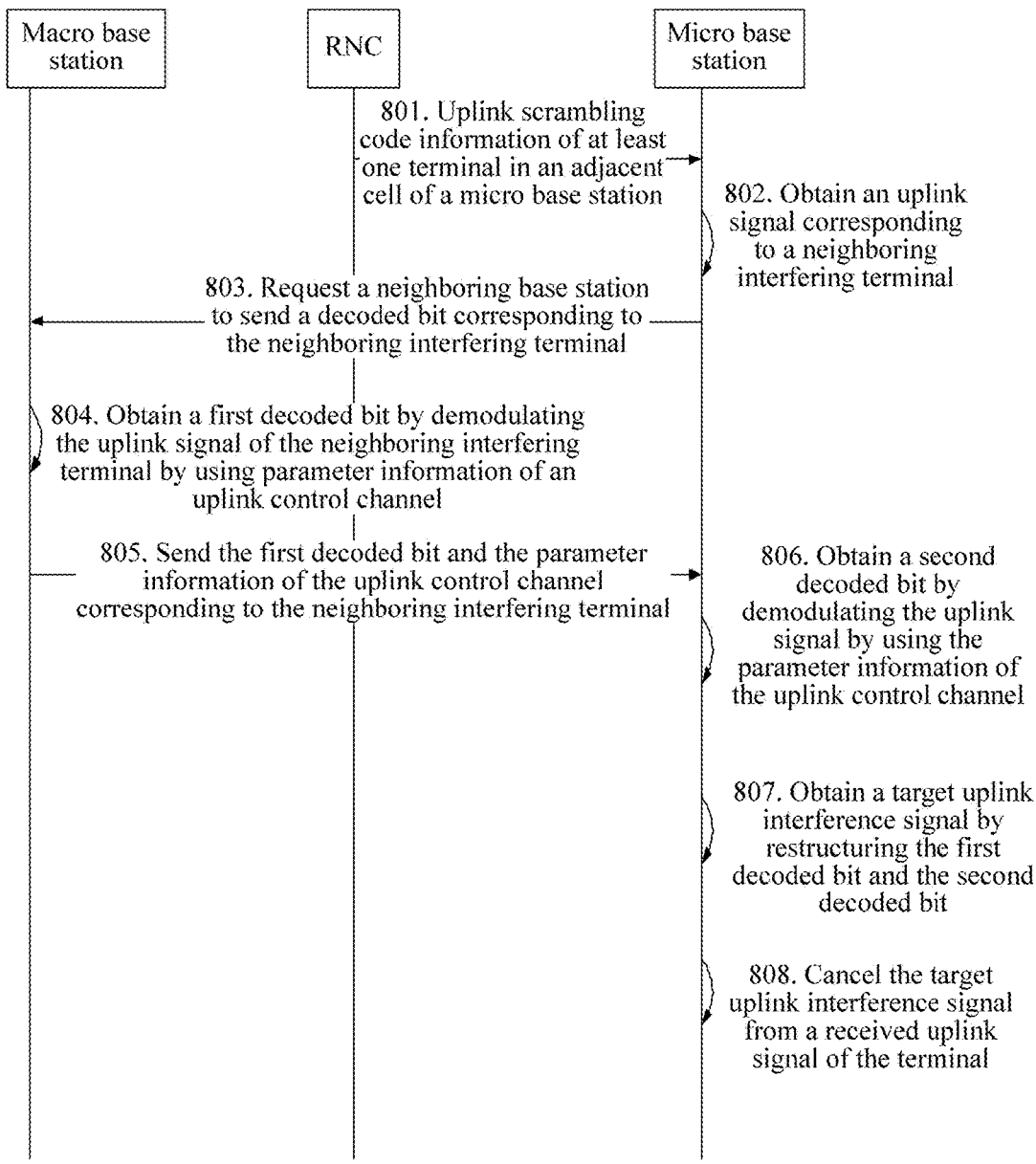
FIG. 8 is a schematic signaling diagram of still another terminal control method according to an embodiment of the present invention.

FIG. 8 is a schematic signaling diagram of still another terminal control method according to this embodiment of the present invention. The method also describes an interference cancellation process, for example, a process in which a micro base station cancels an uplink signal of UE3. This embodiment is equivalent to a combination of Embodiment 5 and Embodiment 6. As shown in FIG. 8, the method may include the following steps.

801. A micro base station receives uplink scrambling code information that is of at least one terminal in an adjacent cell of the micro base station and that is sent by an RNC.

The RNC may report uplink scrambling code information of all UEs in the adjacent cell of the micro base station to the micro base station.

802. The micro base station acquires an uplink signal of each neighboring UE according to the uplink scrambling code information, and selects a neighboring interfering UE with strong interference according to a signal strength, to obtain an uplink signal corresponding to the neighboring interfering terminal.

For example, the micro base station acquires an uplink signal of UE3.

803. The micro base station requests a neighboring base station to send a decoded bit corresponding to the neighboring interfering terminal.

In this embodiment, after determining that UE3 is the neighboring interfering terminal, the micro base station may instruct a macro base station to send a decoded bit corresponding to UE3, so as to reconstruct a signal of UE3 by using the decoded bit. When sending the instruction, the micro base station may also send uplink scrambling code information corresponding to UE3 or an identifier of another UE to the macro base station, so that the macro base station can learn that the decoded bit of UE3 is to be obtained.

Optionally, the decoded bit may be regularly reported to the micro base station by the macro base station.

804. The neighboring base station acquires parameter information of an uplink control channel of the neighboring interfering terminal, and demodulates the uplink signal of the neighboring interfering terminal by using the parameter information, to obtain a first decoded bit.

In this embodiment, the macro base station acquires parameter information of an uplink control channel corresponding to UE3, and demodulates the uplink signal of UE3 by using the parameter information, to obtain a decoded bit, where the decoded bit may be, for example, a decoded soft bit or a decoded hard bit. The uplink signal may be a signal sent by UE3 to the macro base station in an uplink direction. In order to be differentiated from another decoded bit in a subsequent step, the decoded bit obtained by the macro base station in this step is called the first decoded bit.

805. The micro base station receives the first decoded bit sent by the neighboring base station, and the parameter information of the uplink control channel corresponding to the neighboring interfering terminal.

In this embodiment, the macro base station sends, to the micro base station, the first decoded bit obtained in step 804 together with the parameter information of the uplink control channel of UE3 and that of the macro base station in the uplink direction.

806. The micro base station demodulates the uplink signal by using the parameter information of the uplink control channel, to obtain a second decoded bit.

After identifying the uplink signal of UE3 from the received uplink signals, the micro base station can demodulate the uplink signal of UE3 by using the parameter information, for example, an SF, of the uplink control channel that is corresponding to UE3 and that is received by the macro base station, to obtain the second decoded bit.

807. The micro base station obtains a target uplink interference signal by reconstructing the first decoded bit and the second decoded bit.

808. The micro base station cancels the target uplink interference signal from a received uplink signal of a terminal.

In addition, for UE4 and UE5 in a handover area in FIG. 1, both the micro base station and the macro base station can use IC for interference cancellation, or the micro base station and the macro base station may use interference cancellation (IC) and interference rejection combining (IRC) for interference cancellation for a UE in a non-handover area in their cells.

It should be noted that this embodiment does not strictly restrict an execution order of the steps. In addition, the interference cancellation solution in this embodiment uses the micro base station as an example, and can also be applied to the macro base station. For example, the macro base station can cancel a signal of UE5 as an interference signal by using this method. Optionally, in addition to being executed after power control of a terminal, the foregoing interference cancellation solutions in Embodiment 5 to Embodiment 7 may also be independently implemented in a heterogeneous network, which is not limited herein.

Embodiment 8

Figure 9:
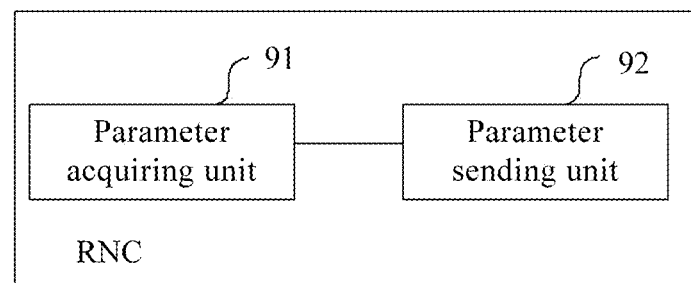
FIG. 9 is a schematic structural diagram of a radio network controller according to an embodiment of the present invention.

FIG. 9 is a schematic structural diagram of a radio network controller according to an embodiment of the present invention. The RNC may implement the methods of the embodiments of the present invention, and this embodiment only briefly describes a structure of the RNC. For a specific working principle, reference may be made to the method embodiments. As shown in FIG. 9, the RNC may include: a parameter acquiring unit 91 and a parameter sending unit 92.

The parameter acquiring unit 91 is configured to acquire a target power control value when it is determined that a downlink serving base station of a terminal that establishes a connection with both a macro base station and a micro base station is the macro base station, where the target power control value is used to ensure that channel quality of an uplink control channel from the terminal to the macro base station reaches a target threshold; and the parameter sending unit 92 is configured to send the target power control value to the micro base station, so that the micro base station controls uplink transmit power of the terminal according to the target power control value.

Further, the parameter acquiring unit 91 is specifically configured to receive a target channel measurement counter value that is of the uplink control channel and that is sent by the macro base station, and use a power control value corresponding to the target channel measurement counter value as the target power control value.

Further, the parameter acquiring unit 91 is specifically configured to receive the target power control value sent by the macro base station, where the target power control value is the power control value that is corresponding to the target channel measurement counter value of the uplink control channel and that is obtained by the macro base station.

Further, the parameter sending unit 92 is further configured to send user information of at least one terminal in an adjacent cell of the micro base station to the micro base station, so that the micro base station cancels, according to the user information of the at least one terminal, a target uplink interference signal of the terminal from an uplink signal that is of the terminal and that is received by the micro base station.

Embodiment 9

Figure 10:
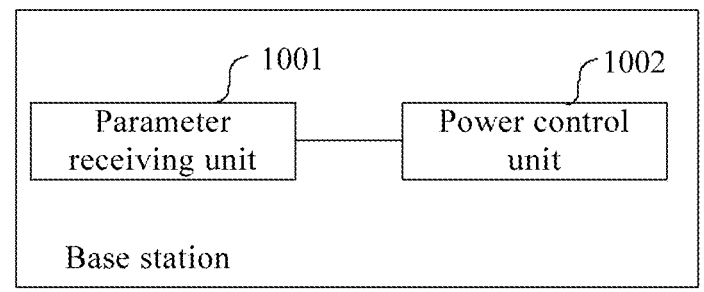
FIG. 10 is a schematic structural diagram of a base station according to an embodiment of the present invention.

FIG. 10 is a schematic structural diagram of a base station according to an embodiment of the present invention. The base station may implement the methods of the embodiments of the present invention, and this embodiment only briefly describes a structure of the base station. For a specific working principle, reference may be made to the method embodiments. In addition, the base station may be a micro base station, or optionally, a macro base station.

As shown in FIG. 10, the base station may include: a parameter receiving unit 1001 and a power control unit 1002. The parameter receiving unit 1001 is configured to obtain a target power control value sent by an RNC, where the target power control value is used to ensure that channel quality of an uplink control channel from a terminal to a macro base station reaches a target threshold. The power control unit 1002 is configured to control uplink transmit power of the terminal according to the target power control value, where the terminal establishes a connection with both the macro base station and a micro base station, and a downlink serving base station of the terminal is the macro base station.

Figure 11:
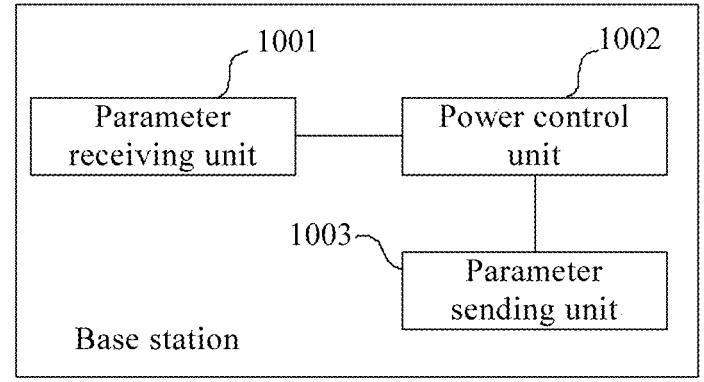
FIG. 11 is a schematic structural diagram of another base station according to an embodiment of the present invention.

FIG. 11 is a schematic structural diagram of another base station according to this embodiment of the present invention. On a basis of the structure in FIG. 10, if the base station is a macro base station, the base station may further include: a parameter sending unit 1003, configured to send a channel measurement counter value of the uplink control channel to the RNC, so that the RNC adjusts a power control value according to the channel measurement counter value, and uses a power control value corresponding to a target channel measurement counter value as the target power control value. That is, the target power control value is a corresponding power control value obtained by the RNC according to the target channel measurement counter value that is of the uplink control channel and that is sent by the macro base station.

Figure 12:
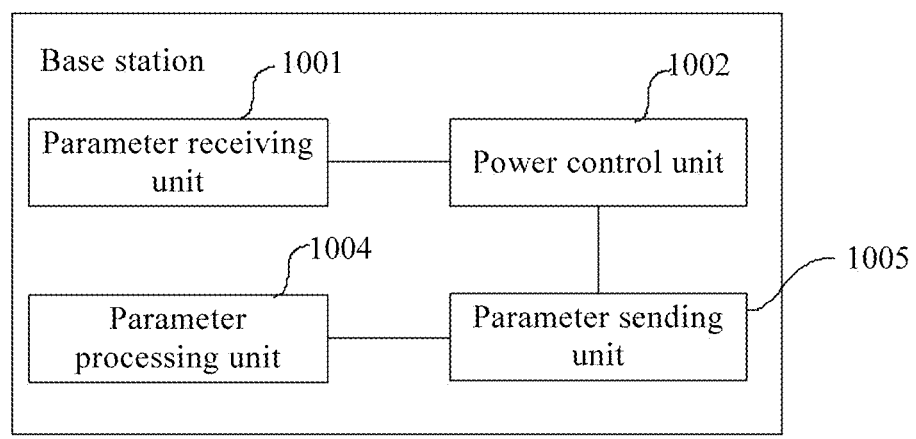
FIG. 12 is a schematic structural diagram of still another base station according to an embodiment of the present invention.

FIG. 12 is a schematic structural diagram of still another base station according to an embodiment of the present invention. On a basis of the structure in FIG. 10, if the base station is a macro base station, the base station may further include: a parameter processing unit 1004 and a parameter sending unit 1005, where the parameter processing unit 1004 is configured to acquire a channel measurement counter value of the uplink control channel, and adjust a power control value according to the channel measurement counter value, until obtaining a power control value corresponding to a target channel measurement counter value as the target power control value; and the parameter sending unit 1005 is configured to send the target power control value to the RNC.

That is, the target power control value is received from the macro base station by the RNC.

Figure 13:
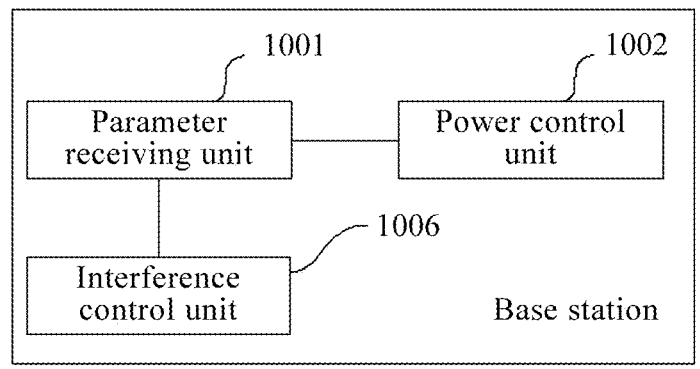
FIG. 13 is a schematic structural diagram of still another base station according to an embodiment of the present invention.

FIG. 13 is a schematic structural diagram of still another base station according to this embodiment of the present invention. On a basis of the structure in FIG. 10, the base station may further include: an interference control unit 1006, where the parameter receiving unit 1001 is further configured to receive user information that is of at least one terminal in an adjacent cell of the base station and that is sent by the RNC. The interference control unit 1006 is configured to cancel, according to the user information, a target uplink interference signal of the terminal from an uplink signal that is of the terminal and that is received by the base station.

Optionally, the parameter receiving unit 1001 is specifically configured to receive uplink scrambling code information that is of the at least one terminal in the adjacent cell of the base station and that is sent by the RNC, and parameter information of an uplink control channel from the terminal to the adjacent cell of the base station; and the interference control unit 1006 is specifically configured to acquire an uplink signal of the terminal according to the uplink scrambling code information; demodulate the uplink signal by using the parameter information of the uplink control channel, to obtain a decoded bit, obtain the target uplink interference signal according to the decoded bit; and cancel the target uplink interference signal from the uplink signal that is of the terminal and that is received by the micro base station.

Optionally, it may further be that: the parameter receiving unit 1001 is specifically configured to receive uplink scrambling code information that is of the at least one terminal in the adjacent cell of the base station and that is sent by the RNC, a decoded bit sent by a neighboring base station to which the terminal belongs, and parameter information of an uplink control channel of the terminal, where the decoded bit is obtained by the neighboring base station by demodulating an uplink signal of the terminal; and the interference control unit 1006 is specifically configured to acquire an uplink signal of the terminal according to the uplink scrambling code information, estimate uplink channel information of the terminal according to the parameter information of the uplink control channel, obtain the target uplink interference signal by reconstructing the decoded bit and the uplink channel information, and cancel the target uplink interference signal from the uplink signal that is of the terminal and that is received by the base station.

Optionally, it may further be that: the parameter receiving unit 1001 is specifically configured to receive uplink scrambling code information that is of the at least one terminal in the adjacent cell of the base station and that is sent by the RNC, a first decoded bit sent by a neighboring base station to which the terminal belongs, and parameter information of an uplink control channel of the terminal and that of the neighboring base station to which the terminal belongs, where the first decoded bit is obtained by the neighboring base station by demodulating an uplink signal of the terminal; and the interference control unit 1006 is specifically configured to acquire an uplink signal of the terminal according to the uplink scrambling code information, demodulate the uplink signal by using the parameter information of a sector control channel, to obtain a second decoded bit, obtain the target uplink interference signal by reconstructing the first decoded bit and the second decoded bit, and cancel the target uplink interference signal from the received uplink signal of the terminal.

Figure 14:
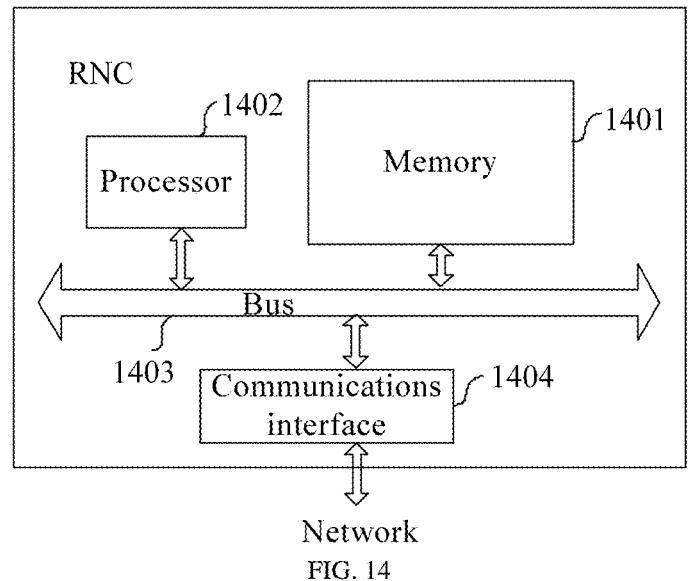
FIG. 14 is a schematic structural diagram of an entity of an RNC according to an embodiment of the present invention.

FIG. 14 is a schematic structural diagram of an entity of an RNC according to this embodiment of the present invention, which is used to implement the terminal control methods as described in the embodiments of the present invention. For a specific working principle, reference may be made to the foregoing method embodiments. As shown in FIG. 14, the RNC may include: a memory 1401, a processor 1402, a bus 1403, and a communications interface 1404, where connection and mutual communication among the processor 1402, the memory 1401, and the communications interface 1404 are implemented by using the bus 1403.

The communications interface 1404 is configured to communicate with an external device, and acquire a target power control value when the processor 1402 determines that a downlink serving base station of a terminal that establishes a connection with both a macro base station and a micro base station is the macro base station, where the target power control value is used to ensure that channel quality of an uplink control channel from the terminal to the macro base station reaches a target threshold. The communications interface 1404 is further configured to send the target power control value to the micro base station, so that the micro base station controls uplink transmit power of the terminal according to the target power control value. The memory 1401 is configured to store the target power control value.

Further, the communications interface 1404 is further configured to receive a target channel measurement counter value that is of the uplink control channel and that is sent by the macro base station. The processor 1402 is configured to use a power control value corresponding to the target channel measurement counter value as the target power control value.

Further, the communications interface 1404 is further configured to receive the target power control value sent by the macro base station, where the target power control value is the power control value that is corresponding to the target channel measurement counter value of the uplink control channel and that is obtained by the macro base station.

Further, the processor 1402 is further configured to instruct the communications interface 1404 to send user information of at least one terminal in an adjacent cell of the micro base station to the micro base station, so that the micro base station cancels, according to the user information of the at least one terminal, a target uplink interference signal of the terminal from an uplink signal that is of the terminal and that is received by the micro base station.

Figure 15:
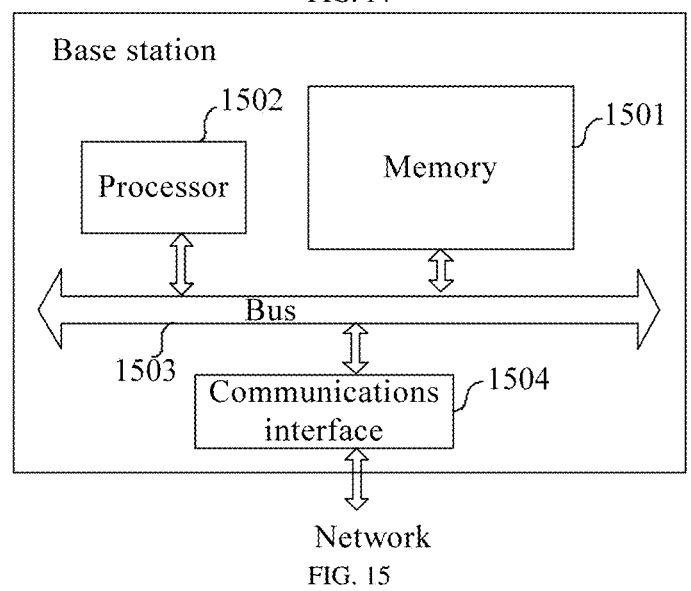
FIG. 15 is a schematic structural diagram of an entity of a base station according to an embodiment of the present invention.

FIG. 15 is a schematic structural diagram of an entity of a base station according to this embodiment of the present invention, which is used to implement the terminal control methods as described in the embodiments of the present invention. For a specific working principle, reference may be made to the foregoing method embodiments. As shown in FIG. 15, the base station may include: a memory 1501, a processor 1502, a bus 1503, and a communications interface 1504, where connection and mutual communication among the processor 1502, the memory 1501, and the communications interface 1504 are implemented by using the bus 1503.

The communications interface 1504 is configured to communicate with an external device, and acquire a target power control value sent by the RNC, where the target power control value is used to ensure that channel quality of an uplink control channel from a terminal to a macro base station reaches a target threshold. The memory 1501 is configured to store the target power control value.

The processor 1502 is configured to control uplink transmit power of the terminal according to the target power control value, where the terminal establishes a connection with both the macro base station and a micro base station, and a downlink serving base station of the terminal is the macro base station.

Further, when the base station is the macro base station, the communications interface 1504 is further configured send a target channel measurement counter value of the uplink control channel to the RNC, so that the RNC uses a power control value corresponding to the target channel measurement counter value as the target power control value. That is, the target power control value is a power control value obtained by the RNC according to the target channel measurement counter value that is of the uplink control channel and that is sent by the macro base station.

Further, when the base station is the macro base station, the communications interface 1504 is further configured to acquire the target power control value sent by the RNC, where the target power control value is the corresponding power control value obtained by the RNC according to the target channel measurement counter value of the uplink control channel.

Further, the communications interface 1504 is further configured to receive user information that is of at least one terminal in an adjacent cell of the base station and that is sent by the RNC, and the processor 1502 is further configured to cancel, according to the user information, a target uplink interference signal of the terminal from an uplink signal that is of the terminal and that is received by the base station.

Optionally, the communications interface 1504 is specifically configured to receive uplink scrambling code information that is of the at least one terminal in the adjacent cell of the base station and that is sent by the RNC, and parameter information of an uplink control channel from the terminal to the adjacent cell of the base station; and the processor 1502 is specifically configured to acquire an uplink signal of the terminal according to the uplink scrambling code information; demodulate the uplink signal by using the parameter information of the uplink control channel, to obtain a decoded bit, obtain the target uplink interference signal according to the decoded bit; and cancel the target uplink interference signal from the uplink signal that is of the terminal and that is received by the micro base station.

Optionally, the communications interface 1504 is specifically configured to receive uplink scrambling code information that is of the at least one terminal in the adjacent cell of the base station and that is sent by the RNC, a decoded bit sent by a neighboring base station to which the terminal belongs, and parameter information of an uplink control channel of the terminal, where the decoded bit is obtained by the neighboring base station by demodulating an uplink signal of the terminal. The processor 1502 is specifically configured to acquire an uplink signal of the terminal according to the uplink scrambling code information, estimate uplink channel information of the terminal according to the parameter information of the uplink control channel, obtain the target uplink interference signal by reconstructing the decoded bit and the uplink channel information, and cancel the target uplink interference signal from the uplink signal that is of the terminal and that is received by the base station.

Optionally, the communications interface 1504 is specifically configured to receive uplink scrambling code information that is of the at least one terminal in the adjacent cell of the base station and that is sent by the RNC, a first decoded bit sent by a neighboring base station to which the terminal belongs, and parameter information of an uplink control channel of the terminal and that of the neighboring base station to which the terminal belongs, where the decoded bit is obtained by the neighboring base station by demodulating an uplink signal of the terminal. The processor 1502 is specifically configured to acquire an uplink signal of the terminal according to the uplink scrambling code information, demodulate the uplink signal by using the parameter information of the uplink control channel, to obtain a second decoded bit, obtain the target uplink interference signal by reconstructing the first decoded bit and the second decoded bit, and cancel the target uplink interference signal from the received uplink signal of the terminal.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as these modifications or replacements do not cause the essence of the corresponding technical solutions to depart from the scope of the technical solutions of the embodiments of the present invention.

What is claimed is:

1. A method, comprising:
acquiring, by a micro base station, a target power control value sent by a radio network controller (RNC), wherein the target power control value is used to ensure that channel quality of a first uplink control channel from a first terminal to a macro base station reaches a target threshold, and wherein a heterogeneous network comprises the micro base station, the RNC, and the macro base station;
controlling, by the micro base station according to the target power control value, uplink transmit power of the first terminal, wherein the first terminal establishes a connection with both the macro base station and the micro base station, and wherein a downlink serving base station of the first terminal is the macro base station;
after controlling the uplink transmit power of the first terminal, receiving, by the micro base station, user information of a second terminal in an adjacent cell of the micro base station, wherein the user information of the second terminal is sent by the RNC; and
canceling, according to the user information of the second terminal, a target uplink interference signal of the first terminal from an uplink signal of the first terminal that is received by the micro base station.

2. The method according to claim 1, wherein the target power control value is a corresponding power control value obtained by the RNC according to a target channel measurement counter value of the first uplink control channel, and wherein the target channel measurement counter value is sent by the macro base station.

3. The method according to claim 1, wherein the target power control value is received from the macro base station by the RNC.

4. The method according to claim 1, wherein receiving the user information of the second terminal, and canceling the target uplink interference signal of the first terminal from the uplink signal, comprises:
receiving, by the micro base station, uplink scrambling code information of the second terminal in the adjacent cell of the micro base station, and parameter information of a second uplink control channel from the second terminal to the adjacent cell of the micro base station, and wherein the uplink scrambling code information is sent by the RNC;
acquiring, by the micro base station, an uplink signal of the second terminal according to the uplink scrambling code information;
demodulating, by the micro base station, the uplink signal of the second terminal using the parameter information of the second uplink control channel, to obtain a decoded bit;
obtaining the target uplink interference signal according to the decoded bit; and
canceling the target uplink interference signal from the uplink signal of the first terminal that is received by the micro base station.

5. The method according to claim 1, wherein receiving the user information of the second terminal, and canceling the target uplink interference signal of the first terminal from the uplink signal, comprises:
receiving, by the micro base station, uplink scrambling code information of the second terminal in the adjacent cell of the micro base station, a decoded bit sent by a neighboring base station to which the second terminal belongs, and parameter information of a second uplink control channel from the second terminal to the neighboring base station, wherein the decoded bit is obtained by the neighboring base station by demodulating an uplink signal of the second terminal, and wherein the uplink scrambling code information is sent by the RNC;
acquiring, by the micro base station, an uplink signal of the second terminal according to the uplink scrambling code information;
estimating uplink channel information of the second terminal according to the parameter information of the second uplink control channel;
obtaining the target uplink interference signal by reconstructing the decoded bit and the uplink channel information; and
canceling the target uplink interference signal from the uplink signal of the first terminal that is received by the micro base station.

6. The method according to claim 1, wherein receiving the user information of the second terminal, and canceling the target uplink interference signal of the first terminal from the uplink signal, comprises:
receiving, by the micro base station, uplink scrambling code information of the second terminal in the adjacent cell of the micro base station, a first decoded bit sent by a neighboring base station to which the second terminal belongs, and parameter information of a second uplink control channel from the second terminal to the adjacent cell of the micro base station, wherein the first decoded bit is obtained by the neighboring base station by demodulating an uplink signal of the second terminal, and wherein the uplink scrambling code information is sent by the RNC;
acquiring, by the micro base station, an uplink signal of the second terminal according to the uplink scrambling code information;
demodulating the uplink signal using the parameter information of the second uplink control channel to obtain a second decoded bit;
obtaining the target uplink interference signal by reconstructing the first decoded bit and the second decoded bit; and
canceling, by the micro base station, the target uplink interference signal from the received uplink signal of the first terminal.

7. A radio network controller (RNC), comprising:
a non-transitory memory that stores at least one program code; and
at least one computing hardware configured to cause, through execution of the at least one program code, the RNC to:
acquire a target power control value when it is determined that a downlink serving base station of a first terminal is a macro base station, wherein the target power control value is used to ensure that channel quality of an uplink control channel from the first terminal to the macro base station reaches a target threshold, and wherein the first terminal establishes a connection with both the macro base station and a micro base station;

send the target power control value to the micro base station for the micro base station to use to control uplink transmit power of the first terminal according to the target power control value; and send user information of a second terminal in an adjacent cell of the micro base station to the micro base station, causing the micro base station to cancel, according to the user information of the second terminal, a target uplink interference signal of the first terminal from an uplink signal of the first terminal that is received by the micro base station.

8. The RNC according to claim 7, wherein the at least one computing hardware is further configured to cause the RNC to:

receive a target channel measurement counter value of the uplink control channel that is sent by the macro base station, and use a power control value corresponding to the target channel measurement counter value as the target power control value.

9. The RNC according to claim 7, wherein the at least one computing hardware is further configured to cause the RNC to:

receive the target power control value sent by the macro base station, wherein the target power control value is a power control value that corresponds to a target channel measurement counter value of the uplink control channel and is obtained by the macro base station.

10. A base station, comprising:

at least one non-transitory memory to store at least one program code; and at least one computing hardware to cause, through execution of the at least one program code, the base station to:

acquire a target power control value sent by an radio network controller (RNC), wherein the target power control value is used to ensure that channel quality of a first uplink control channel from a first terminal to a macro base station reaches a target threshold;

control uplink transmit power of the first terminal according to the target power control value, wherein the first terminal establishes a connection with both the macro base station and the base station, and a downlink serving base station of the first terminal is the macro base station;

receive user information of a second terminal in an adjacent cell of the base station, wherein the user information is sent by the RNC; and cancel, according to the user information, a target uplink interference signal of the first terminal from an uplink signal of the first terminal that is received by the base station.

11. The base station according to claim 10, wherein the target power control value is a corresponding power control value obtained by the RNC according to a target channel measurement counter value of the first uplink control channel, and wherein the target channel measurement counter value is sent by the macro base station.

12. The base station according to claim 10, wherein the target power control value is received from the macro base station by the RNC.

13. The base station according to claim 10, wherein the at least one computing hardware is further configured to cause the base station to:

receive uplink scrambling code information of the second terminal in the adjacent cell of the base station, and parameter information of a second uplink control channel from the second terminal to the adjacent cell of the base station, wherein the uplink scrambling code information is sent by the RNC;

acquire an uplink signal of the second terminal according to the uplink scrambling code information;

demodulate the uplink signal using the parameter information of the second uplink control channel, to obtain a decoded bit;

obtain the target uplink interference signal according to the decoded bit; and cancel the target uplink interference signal from the uplink signal of the first terminal that is received by the base station.

14. The base station according to claim 10, wherein the at least one computing hardware is further configured to cause the base station to:

receive uplink scrambling code information of the second terminal in the adjacent cell of the base station, a decoded bit sent by a neighboring base station to which the second terminal belongs, and parameter information of a second uplink control channel of the second terminal, wherein the decoded bit is obtained by the neighboring base station by demodulating an uplink signal of the second terminal, and wherein the uplink scrambling code information is sent by the RNC;

acquire the uplink signal of the second terminal according to the uplink scrambling code information;

estimate uplink channel information of the second terminal according to the parameter information of the second uplink control channel;

obtain the target uplink interference signal by reconstructing the decoded bit and the uplink channel information; and cancel the target uplink interference signal from the uplink signal of the first terminal that is received by the base station.

15. The base station according to claim 14, wherein the at least one computing hardware is further configured to cause the base station to:

receive uplink scrambling code information of the second terminal in the adjacent cell of the base station, a first decoded bit sent by a neighboring base station to which the second terminal belongs, and parameter information of a second uplink control channel of the second terminal and that of the neighboring base station to which the second terminal belongs, wherein the first decoded bit is obtained by the neighboring base station by demodulating an uplink signal of the second terminal, and wherein the uplink scrambling code information is sent by the RNC;

acquire an uplink signal of the second terminal according to the uplink scrambling code information;

demodulate the uplink signal by using the parameter information of the second uplink control channel, to obtain a second decoded bit;

obtain the target uplink interference signal by reconstructing the first decoded bit and the second decoded bit; and cancel the target uplink interference signal from the received uplink signal of the first terminal.

* * * * *